M. EYTH.
Steam-Plow Attachment.

No. 84,621.

Patented Dec. 1, 1868.

Witnesses:
E. F. Kastenhuber
Chas. Wahlers

Inventor;
M. Eyth
by
Van Santvoord & Hauff

United States Patent Office.

MAX EYTH, OF NEW YORK, N. Y.

Letters Patent No. 84,621, dated December 1, 1868.

---

IMPROVEMENT IN ROPE-BEARING ATTACHMENT IN MACHINES FOR STEAM CULTURE.

---

The Schedule referred to in these Letters Patent and making part of the same.

---

*To all whom it may concern:*

Be it known that I, MAX EYTH, of the city, county, and State of New York, have invented a new and useful Improvement in Steam-Plows; and I do hereby declare the following to be a full, clear, and exact description thereof, which will enable those skilled in the art to make and use the same, reference being had to the accompanying drawing, forming part of this specification, in which drawing—

Figure 1:
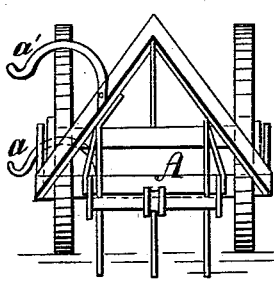
Figure 2:
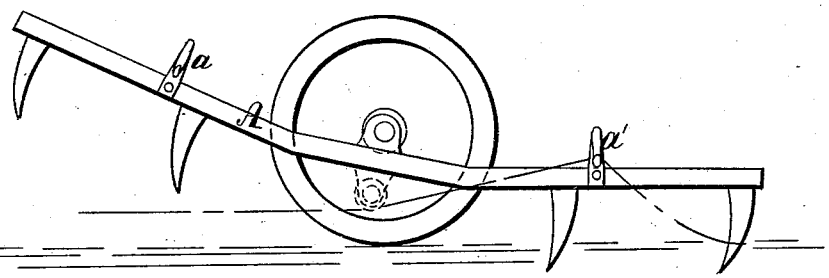
Figure 3:
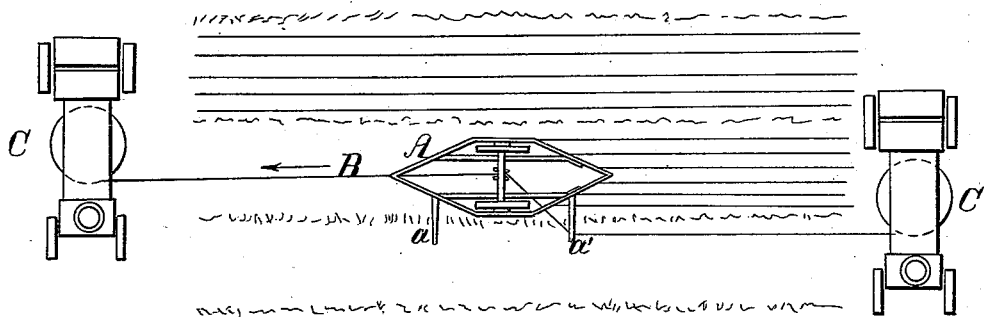

Figure 1 represents an end view of this invention.
Figure 2 is a side elevation thereof.
Figure 3 is a top view thereof.

Similar letters indicate corresponding parts.

This invention relates to steam-plows of that class in which the plow is drawn from one end of the field to the other by wire ropes attached to any suitable motive-power.

Heretofore an apparatus of this class could not be used for cultivating the growing crops of corn, cotton, sugar, or other plants, because the outstrippers or arms carrying the slack rope are so low down to the ground (being mere extensions of the axles) that the same, in sweeping over the field, from one row to the other, at a short distance above the ground, would have broken and injured the growing plants.

This difficulty is overcome by my invention, which consists in the arrangement of two arms, projecting from the sides of the cultivator or plow, curved upward to such a height above the ground that they will pass over the growing crops, without injuring the same, and that the steam-plow can be used for cultivating as well as for breaking land.

A represents a plow or cultivator, which is drawn from one end of the field to the other by a rope, B, and two traction-engines, C, situated at the opposite ends of the field, as indicated in red outlines in fig. 3 of the drawing.

From the side of the cultivator extend two arms, $a$ $a'$, curved upward to such a height above the ground that the same will clear the growing plants, and extend over the tops thereof, as indicated in fig. 1.

If the implement is drawn across the field, in the direction of the arrow marked near it in fig. 3, I hitch the hind or slack rope to the arm $a'$, and as the implement moves along between two rows, said slack rope is deposited between the succeeding rows.

At the end of the field the traction-engine and the plows are moved to the succeeding rows; the slack rope is hitched to the arm $a$, and as the implement is drawn to the opposite end of the field between these rows, the slack rope is again deposited between the succeeding rows, and the operation of cultivating can thus be conducted without producing the least injury to the growing crops.

I do not claim broadly, as my invention, the arrangement of an "outstripper" on the steam-plow, such device being described in the English patent, 11,304, dated July 23, 1846; but

What I claim as new, and desire to secure by Letters Patent, is—

Curving the arms or "outstrippers" $a$ $a'$ upward, so that the same will clear the growing crops, as herein shown and described.

MAX EYTH.

Witnesses:
W. HAUFF,
E. F. KASTENHUBER.